Patented Apr. 11, 1939

2,154,334

UNITED STATES PATENT OFFICE 2,154,334

MANUFACTURE OF THIONES AND SELENONES

John David Kendall, Ilford, England, assignor to Ilford Limited, Ilford, England, a British company No Drawing. Application May 18, 1937, Serial No. 143,398. In Great Britain May 20, 1936

8 Claims. (Cl. 260—302)

This invention relates to the manufacture of N-alkylated µ-thiones and selenones of five membered heterocyclic nitrogen ring compounds.

Several methods have been proposed for the manufacture of such thiones and selenones. In most cases, however, the starting materials are expensive, the steps intricate and the yields poor. I have now found that it is possible to obtain N-alkylated thiones and selenones of the five-membered heterocyclic nitrogen ring compounds in good yields relatively easily from starting materials which are relatively cheap or which may be produced quite cheaply.

According to the present invention the process for the production of N-alkylated µ-thiones and selenones of the five-membered heterocyclic nitrogen ring compounds comprises treating the µ-mercaptan or seleno-mercaptan of the heterocyclic nitrogen ring compound corresponding to the thione or selenone it is desired to produce with an alkylating agent in order to convert the mercaptan or seleno-mercaptan group to the alkyl-mercapto (i. e. thioether or selenoether) group, treating the resulting compound with an alkyl salt to form its quaternary ammonium salt and heating the resulting quaternary ammonium salt with a weak organic base, for example, pyridine, to produce the N-alkylated µ-thione or selenone.

The process of the invention is applicable to the production of N-alkylated µ-thiones and selenones from any of the heterocyclic nitrogen compounds containing a five-membered heterocyclic nitrogen ring of the type used in the production of cyanine dyes, for example substituted and unsubstituted thiazoles, thiazolines, oxazoles, oxazolines, selenazoles, selenazolines, indolenines, thiodiazoles and the corresponding polycyclic compounds such as benzthiazoles, naphthathiazoles.

In general, the best results are obtained by the process of the present invention when pyridine is employed as the base, but other weak organic bases such as picoline may also be employed.

According to the preferred method of carrying out the process of the invention the mercaptan or seleno-mercaptan of the heterocyclic nitrogen compounds whose thione or selenone it is desired to produce, is alkylated, for example, by treating with methyl sulphate in caustic soda solution to form the thioether or selenoether derivative which is then heated for several hours at about 130–150° C. with a molecular proportion of an alkyl salt such as an alkyl sulphate or an alkyl-p-toluene sulphonate to form the quaternary ammonium alkyl salt. The reaction mixture is then boiled with a small quantity of a weak organic base, for example pyridine, for about an hour, until complete solution is effected. On dilution of the solution with water, the N-alkylated thione or selenone is precipitated and may then be collected and purified by recrystallisation from alcohol or benzene or by distillation at low pressures.

In many cases the yields of thione and selenone obtained are almost theoretical when calculated on the quantity of thioether or selenoether employed.

The following specific examples, which are given by way of example only, illustrate the process of the present invention:

EXAMPLE I

PREPARATION OF N-METHYLDIHYDROBENZOXAZOLE-1-THIONE (a) *Preparation of 1-methylmercaptobenzoxazole*

58 gms. of 1-mercaptobenzoxazole, prepared by heating orthoaminophenol with carbon-disulphide in spirit, were dissolved in 185 ccs. of 10% sodium hydroxide. 48.2 gms. of dimethyl-sulphate were then added gradually with shaking whilst keeping the temperature of the mixture at about 40° C. On standing an oily substance settled out, which was extracted with benzene, washed with water and dehydrated with sodium bicarbonate and potassium carbonate. The solution was then freed from benzene by distillation and the residue purified by distillation in vacuo, as a colourless liquid boiling at 130–135° C. at 10 mms. pressure.

(b) *Conversion to the thione*

44 gms. of 1-methylmercaptobenzoxazole obtained as above were heated with 50 gms. of methyl-p-toluene sulphonate for four hours at 130–140° C. 20 ccs. of pyridine were then added and the mixture was boiled under a reflux condenser for twenty minutes. The mixture was then poured into water and further diluted until no further precipitate was formed. The precipitate was filtered off, washed with water and crystallised from spirit to yield almost colourless prisms melting at 133° C.

EXAMPLE II

PREPARATION OF N-ETHYLDIHYDROBENZOXAZOLE-1-THIONE (a) *Preparation of 1-ethylmercaptobenzoxazole*

150 gms. of 1-mercaptobenzoxazole were dissolved in 120 ccs. of a 30% solution of sodium hydroxide and 400 ccs. of spirit. 135 ccs. of ethylbromide were then added and the mixture was gently refluxed on a water bath for about two hours. The mixture was then diluted with water and the heavy oily product which formed was separated off, dissolved in ether and dried by standing over potassium carbonate. The ether was removed, and the residual oil was distilled in vacuo giving a colourless odourless liquid, boiling at 138–145° C. at 14 mm. pressure.

(b) *Conversion of thione*

20 gms. of 1-ethylmercaptobenzoxazole, prepared as above, and 23 gms. of ethyl-p-toluene sulphonate were heated together for four hours at 150–160° C. 50 ccs. of pyridine were then added and the mixture was gently boiled under a reflux condenser for half an hour. The mixture was then poured into water and diluted until no further precipitate formed. The product was filtered off, washed and dried and recrystallised from dry spirit to give colourless prisms melting at 112°–113° C.

EXAMPLE III

PREPARATION OF 2:4:5-TRIMETHYLDIHYDROBENZOXAZOLE-1-THIONE (a) *Preparation of 1-methylmercapto-4:5-dimethylbenzoxazole*

65 gms. of 1-mercapto-4:5-dimethylbenzoxazole, prepared by heating 5-amino-4-hydroxy-1:2-dimethylbenzene and carbon-disulphide together in solution in spirit, were dissolved in 500 ccs. of an aqueous solution containing 17.5 gms. of sodium hydroxide. The solution was filtered and 35 ccs. of dimethylsulphate were added carefully to the filtrate whilst keeping the temperature down below 50° C. The mixture was then warmed on the water bath for a few minutes and was allowed to cool for an hour when a precipitate settled out. This was filtered off, washed and recrystallised from spirit to yield colourless needles melting at 87° C.

(b) *Conversion of the thione*

20 gms. of 1-methylmercapto-4:5-dimethylbenzoxazole were heated with 20 gms. of methyl-p-toluene sulphonate for four hours at 150° C. 150 ccs. of pyridine were then added and the mixture was gently boiled under a reflux condenser for about fifteen minutes. The mixture was then poured into water and diluted until no further precipitate was formed. The precipitate was then filtered off, washed and recrystallised from dry spirit to give colourless needles melting at 190° C.

EXAMPLE IV

PREPARATION OF 2-ETHYL-4:5-DIMETHYLDIHYDROBENZOXAZOLE-1-THIONE (a) *Preparation of 1-ethylmercapto-4:5-dimethylbenzoxazole*

25 gms. of 1-mercapto-4:5-dimethylbenzoxazole prepared as above in Example III were dissolved in 17 ccs. of 30% sodium hydroxide solution and 60 ccs. of alcohol. 20 gms. of ethyl bromide were then added and the mixture was gently boiled on a water bath under a reflux condenser for two hours. The mixture was then diluted by pouring into a large quantity of water and the precipitate which was formed was filtered off, washed in water and recrystallised from spirit as white needles, melting at 94° C.

(b) *Conversion to thione*

20 gms. of 1-ethylmercapto-4:5-dimethylbenzoxazole and 20 gms. of ethyl-p-toluene sulphonate were heated together for 4 hours at 150–160° C. 150 ccs. of pyridine were then added and the mixture was gently boiled on a water bath under a reflux condenser for about 20 minutes, after which it was diluted by pouring into a large bulk of water. The precipitate which formed was filtered off and recrystallised from spirit as colourless needles melting at 130° C.

EXAMPLE V

PREPARATION OF N-METHYLDIHYDROBENZTHIAZOLE-1-THIONE 90.5 gms. of methylmercaptobenzthiazole, obtained from the alkylation of mercaptobenzthiazole by a process similar to that used for the methylmercaptobenzoxazole described above and as described in the specification of British Patent No. 424,559, and 93 gms. of methyl-p-toluene sulphonate were fused and heated together for about four hours at 130–140° C. 60 ccs. of pyridine were then added and the mixture was boiled under a reflux condenser for about 1 hour. The solution was then poured into water and diluted until no further precipitate was formed. The crystalline solid which was obtained in almost theoretical yield was filtered off and dried and recrystallised from alcohol as almost colourless crystals melting at 90° C. and boiling at 365° C.

EXAMPLE VI

PREPARATION OF N-ETHYLDIHYDROBENZTHIAZOLE-1-THIONE 97 gms. of 1-ethylmercaptobenzthiazole prepared by ethylation of mercaptobenzthiazole by a process similar to that used for 1-ethylmercaptobenzoxazole described above and as described in the specification of British Patent No. 424,559 and 100 gms. of ethyl-p-toluene sulphonate were heated together for about six hours at 150°–160° C. 400 ccs. of pyridine were then added and the mixture boiled under a reflux condenser for about one hour. The solution was then poured into water and diluted until no further oil separated out. On standing and seeding with a crystal obtained from a previous experiment the oily layer crystallised, and was filtered off, washed and dried and recrystallised from spirit to give almost colourless crystals melting at 78–79° C.

EXAMPLE VII

PREPARATION OF N-METHYLDIHYDROBENZTHIAZOLE-1-THIONE 1.86 gms. of 1-methylmercaptobenzthiazole and 2 ccs. of methyliodide were heated together for 3 hours. The mixture was allowed to cool and 15 ccs. of pyridine were added and the mixture boiled under a reflux condenser for about one hour. The mixture was then poured into a beaker of water and allowed to cool when a crystalline solid separated out, this solid was filtered off washed and recrystallised from alcohol to yield colourless crystals melting at 90° C. and boiling at 365° C.

EXAMPLE VIII

PREPARATION OF N-METHYLDIHYDROBENZOXAZOLE-1-THIONE 1.65 gms. of 1-methylmercaptobenzoxazole and 1.25 ccs. of methyl sulphate were heated together at 150 to 160° C. for about four hours. The mixture was then allowed to cool and 30 ccs. of pyridine were added after which the mixture was boiled under a reflux condenser for about half an hour. The mixture was then poured into a beaker of water and allowed to stand and cool when white crystals were deposited. These crystals were collected and recrystallised from alcohol as almost colourless crystals melting at 133° C.

EXAMPLE IX

PREPARATION OF N-METHYL-4:5-DIMETHOXYDIHYDROBENZSELENAZOLE-1-THIONE 1.44 gms. of 1-methylmercapto-4:5-dimethoxybenzselenazole and 1.86 gms. of alkyl-p-toluene sulphonate were heated together for four and a half hours at about 150 to 160° C. The mixture was then allowed to cool and 15 ccs. of pyridine were added after which it was boiled under a reflux condenser for about half an hour. The resulting solution was poured into a beaker of water and allowed to stand and cool when yellow crystals were deposited. These crystals were filtered off and recrystallised from alcohol to yield almost colourless crystals melting at 169° C.

EXAMPLE X

PREPARATION OF N-METHYL-3:4-BENZDIHYDROBENZTHIAZOLE-1-THIONE 4.62 gms. of 1-methylmercapto-3:4-benzbenzthiazole and 3.72 gms. of methyl-p-toluene sulphonate were heated together for six hours at 160 to 170° C. The mixture was then allowed to cool and 35 ccs. of pyridine were added, and the mixture was gently boiled under a reflux condenser until the solid had all dissolved. The solution was then poured into a beaker of water and the solid which separated out was collected, washed and recrystallised from alcohol to give colourless rods melting at 173° C.

EXAMPLE XI

PREPARATION OF N-METHYL-5:6-BENZDIHYDROBENZTHIAZOLE-1-THIONE 4.62 gms. of 1-methylmercapto-5:6-benzbenzthiazole and 3.72 gms. of methyl-p-toluene sulphonate were heated together at 130 to 140° C. for about three hours. The mixture was then allowed to cool and 40 ccs. of pyridine were added after which the mixture was boiled vigorously under a reflux condenser for about one hour when the solid dissolved up. The solution was poured into a beaker of water and cooled when light yellow crystals were deposited. These crystals were collected, washed and recrystallised from dry alcohol as nearly white crystals melting at 168 to 170° C.

EXAMPLE XII

PREPARATION OF N-METHYL-5:6-BENZDIHYDROBENZTHIAZOLE-1-THIONE 4.90 gms. of 1-ethylmercapto-5:6-benzbenzthiazole and 4.0 gms. of ethyl-p-toluene sulphonate were heated together for six hours at 170 to 180° C. The mixture was then allowed to cool and 40 ccs. of pyridine were added and the mixture was boiled under a reflux condenser for about one hour, after which it was poured into a beaker of water and allowed to cool when a solid separated out. This solid was filtered off and recrystallised from alcohol as straw coloured needles melting at 164° C.

EXAMPLE XIII (a) 21.4 gms. of 1-selenomercaptobenzthiazole (prepared by interaction of selenourea with 1-chlorbenzthiazole in alcoholic solution and subsequent treatment with hot water) were dissolved in 80 ccs. of 5% aqueous sodium hydroxide solution, filtered and methylated by shaking with 12.6 gms. methyl sulphate added gradually with shaking, the temperature being kept below 40° C. The mixture was heated on a water bath to 50° C. for 30 minutes, and then cooled by immersion in iced water. A solid product was obtained which was filtered off, washed with water and dried in a vacuum desiccator over sulphuric acid.

(b) 5.65 gms. of the 1-methylselenomercaptobenzthiazole obtained as above and 3.72 gms. of methyl-p-toluene sulphonate were fused together at 140° to 150° C. for three hours. The mass was then allowed to cool and 50 ccs. of pyridine were added and the mixture boiled under a reflux condenser for 30 minutes. The mixture was then poured into a beaker of water when the product was precipitated as an oil which quickly hardened to a solid mass on standing.

I claim:

1. The process for the production of N-alkylated-$\mu$-thiones and selenones of five-membered heterocyclic nitrogen bases of the type used in the production of cyanine dyes which comprises treating a compound taken from the class consisting of $\mu$-mercaptans and selenomercaptans of five-membered heterocyclic nitrogen bases of the type used in the production of cyanine dyes with an alkylating agent to convert the mercaptan group to the corresponding alkylmercapto group, treating the resulting compound with an alkyl salt to form a quaternary ammonium salt, and heating the resulting quaternary ammonium salt with a weak organic base.

2. The process of claim 1 wherein pyridine is employed as the weak organic base.

3. The process of claim 1 wherein methyl sulphate in caustic soda solution is employed for the conversion of the mercaptan group to the corresponding alkylmercapto group.

4. The process which comprises treating a $\mu$-mercapto-thiazole with an alkylating agent to convert the mercapto group to the thioether group, treating the resulting compound with an alkyl salt to form a quaternary ammonium salt, and heating the resulting quaternary ammonium salt with a weak organic base to form the N-alkyl-$\mu$-thione of the thiazole.

5. The process which comprises treating a $\mu$-mercapto-oxazole with an alkylating agent to convert the mercapto group to the thioether group, treating the resulting compound with an alkyl salt to form a quaternary ammonium salt, and heating the resulting quaternary ammonium salt with a weak organic base to form the N-alkyl-$\mu$-thione of the oxazole.

6. The process which comprises treating a $\mu$-mercapto-selenazole with an alkylating agent to convert the mercapto group to the thioether group, treating the resulting compound with an alkyl salt to form a quaternary ammonium salt, and heating the resulting quaternary ammonium salt with a weak organic base to form the N-alkyl-$\mu$-thione of the selenazole.

7. The process which comprises reacting 1-mercaptobenzthiazole with an alkylating agent to convert the mercapto group to the thioether group, reacting the resulting compound with an alkyl salt to form a quaternary ammonium salt, and heating the resulting quaternary ammonium salt with a weak organic base to form the N-alkyl-$\mu$-thione of the thiazole.

8. The process which comprises reacting 1-mercapto-benzoxazole with an alkylating agent to convert the mercapto group to the thioether group, reacting the resulting compound with an alkyl salt to form a quaternary ammonium salt, and heating the resulting quaternary ammonium salt with a weak organic base to form the N-alkyl-$\mu$-thione of the oxazole.

JOHN DAVID KENDALL.